US008273190B2

(12) United States Patent
Rivera

(10) Patent No.: US 8,273,190 B2
(45) Date of Patent: Sep. 25, 2012

(54) METHOD FOR MAKING AND USING CHROMIUM III SALTS

(75) Inventor: Jose B. Rivera, Auburn, PA (US)

(73) Assignee: Bulk Chemicals, Inc., Reading, PA (US)

( * ) Notice: Subject to any disclaimer, the term of this patent is extended or adjusted under 35 U.S.C. 154(b) by 307 days.

(21) Appl. No.: 12/474,960

(22) Filed: May 29, 2009

(65) Prior Publication Data

US 2010/0300891 A1 Dec. 2, 2010

(51) Int. Cl.
*C23C 22/34* (2006.01)
*C23C 22/30* (2006.01)

(52) U.S. Cl. .................. 148/267; 148/247; 148/264

(58) Field of Classification Search .......... 148/247, 148/267, 264
See application file for complete search history.

(56) References Cited

U.S. PATENT DOCUMENTS

| | | | |
|---|---|---|---|
| 4,359,348 A | 11/1982 | Crotty | |
| 4,578,122 A | 3/1986 | Crotty | |
| 4,749,418 A | 6/1988 | Saeki et al. | |
| 4,786,336 A | 11/1988 | Schoener et al. | |
| 5,091,023 A | 2/1992 | Saeki et al. | |
| 5,133,947 A | 7/1992 | Stambaugh et al. | |
| 5,294,266 A | 3/1994 | Hauffe et al. | |
| 5,859,106 A | 1/1999 | Jones et al. | |
| 6,248,181 B1 * | 6/2001 | Osako et al. ............... 148/247 |
| 7,291,217 B2 | 11/2007 | Phelps et al. | |
| 2002/0053301 A1 | 5/2002 | Matzdorf et al. | |
| 2002/0117236 A1 | 8/2002 | Matzdorf et al. | |
| 2004/0231754 A1 | 11/2004 | Phelps et al. | |
| 2006/0180247 A1 | 8/2006 | Matzdorf et al. | |
| 2006/0191599 A1 | 8/2006 | Matzdorf et al. | |
| 2006/0240191 A1 | 10/2006 | Matzdorf et al. | |
| 2007/0187001 A1 | 8/2007 | Kramer et al. | |
| 2009/0280253 A1 | 11/2009 | Church | |
| 2010/0015339 A1 | 1/2010 | Morillo et al. | |

FOREIGN PATENT DOCUMENTS

| | | |
|---|---|---|
| EP | 2 014 793 A2 | 1/2009 |
| WO | WO 2009/137358 A1 | 11/2009 |

OTHER PUBLICATIONS

Coolbaugh, M. Todd, et al., "Readiness of Trivalent Chromium Conversion Coatings for Aluminum Alloys," Corrosion 2000, Mar. 26-31, 2000, pp. 1-11; Orlando, FL; US.
Paniagua et al., "Determination of Chromium(VI) and Chromium(III) by using a Diphenylcarbazide-Modified Carbon Paste Electrode", Electroanalysis, vol. 5, No. 2, Apr. 9, 2005, pp. 155-163.
International Search Report dated Dec. 17, 2010, Int'l Appl. No. PCT/US2010-036392.
Oleinik, S. V., et al.; "Corrosion Inhibitors in Conversion Coatings. IV"; Protection of Metals, 2007, vol. 43, No. 4; pp. 391-397; Pleiades Publishing, Inc.; Austin, TX; US.

\* cited by examiner

*Primary Examiner* — Lois Zheng
(74) *Attorney, Agent, or Firm* — RatnerPrestia

(57) ABSTRACT

A method of preparing an aqueous composition of a chromium III compound, comprising adding hydrogen peroxide to a mixture comprising water and a chromium VI compound in the presence of at least one acid according to the formula $H_2GF_6$, in which G is a Group IV-B element. The composition may contain less than 500 ppm of alkali metal ions and less than 200 ppm of halide ions, relative to chromium and may test negative for chromium VI using s-diphenylcarbazide. The composition may be used for treating a metal surface, among other applications.

4 Claims, No Drawings

METHOD FOR MAKING AND USING CHROMIUM III SALTS

BACKGROUND OF THE INVENTION

Hexavalent chromium compounds have been used as traditional conversion coatings to treat metal surfaces to improve their corrosion resistance and paint adhesion. Hexavalent chromium shows toxicological effects and has been determined by the Environmental Protection Agency as a risk to the environment and by the Occupational Safety and Health Agency as a health risk. Moreover, chemistries based on hexavalent chromium are classified as carcinogens by these agencies.

It is highly desirable to provide coatings and processes free of hexavalent chromium but still capable of providing paint adhesion and corrosion resistance comparable to that provided by conventional hexavalent chromium-based coatings to metal surfaces. Within the past few decades, various compositions and processes not relying on hexavalent chromium have been described and used for treating metal surfaces. Some of these are based on at least partial replacement of hexavalent chromium with trivalent chromium.

Known uses of partially reduced chromium, i.e. compositions containing some trivalent chromium and some hexavalent chromium, include acidulated rinses for phosphated metal surfaces. These acidulated rinse solutions may contain a partially reduced hexavalent chromium solution, i.e. a solution wherein some of the chromium is trivalent. Partially reduced chromium solutions may be manufactured by adding an organic compound such as formaldehyde, methanol, ethanol, etc. to a solution of chromic acid. The chromic acid oxidizes the organic compound, and is itself reduced in the process. The organic compound(s) must generally be added very carefully and slowly to the chromic acid solution, because the resultant heat, boiling and generation of $CO_2$ can be so energetic as to be dangerous. Yet these materials are seldom taken to more than 30% reduction of chromium VI to chromium III unless excess mineral acid is added to help hold the trivalent chromium in solution. Efforts to more completely reduce the chromium VI typically result in sludge formation, and full conversion to trivalent chromium is not achieved by such methods. An exemplary partially reduced (typically about 30% reduced) chromic acid is available from Bulk Chemicals, Inc. of Reading, Pa. under the trade name BULK RINSE® 6A.

The incomplete conversion of chromium VI to chromium III in these and other processes is undesirable in some applications, and thus, methods of producing fully reduced chromium salts would be of benefit to the industry.

SUMMARY OF THE INVENTION

In one aspect, the invention provides a method of preparing an aqueous composition of a chromium III compound. The method includes adding hydrogen peroxide to a mixture including water and a chromium VI compound in the presence of at least one acid according to the formula $H_2GF_6$, in which G is a Group IV-B element.

In another aspect, the invention provides an aqueous composition that includes dissolved $Cr_2(GF_6)_3$, in which G is a Group IV-B element, and contains less than 500 ppm of alkali metal ions and less than 200 ppm of halide ions, relative to chromium and which tests negative for chromium VI using s-diphenylcarbazide.

In a further aspect, the invention provides a method of treating a metal surface. The method includes contacting the metal surface with an aqueous composition including dissolved $Cr_2(GF_6)_3$, in which G is a Group IV-B element, and containing less than 500 ppm in total of alkali metal ions and less than 200 ppm of halide ions, relative to chromium.

DETAILED DESCRIPTION OF THE INVENTION

The invention is directed to chromium III salts essentially free of contaminating ions, i.e., essentially free of ions that are not part of the canonical formula of the salt, and methods for producing and using such salts. These salts will be referred to herein as "high-purity" chromium salts, with the understanding that trace amounts of contaminating ions may be present, typically as a result of impurities in the ingredients. The methods of this invention are suitable for making a variety of high-purity chromium III salts, including but not limited to salts of Group IV-B fluoacids such as chromium fluozirconate, chromium fluotitanate, and chromium fluohafnate. In the case of Group IV-B salts, it is currently believed that the chromium III salts are at least approximately of the formula $Cr_2(GF_6)_3$1 with G representing the Group IV-B metal. For simplicity, the inventors will describe the invention with respect to chromium III fluozirconate, but it will be understood that analogous procedures may be used to make other high-purity chromium III salts as well.

Chromium fluozirconate prepared according to the invention provides excellent corrosion protection on metal surfaces, including at least Al, Zn and alloys of either of these, and may also be useful for providing a passivation layer for electroplating.

Preparation of High-Purity Chromium III Fluozirconate

The method of making high-purity chromium fluozirconate includes reducing aqueous chromic acid and/or partially reduced aqueous chromic acid with hydrogen peroxide, which is itself oxidized in the process to form gaseous $O_2$. If chromic acid is used, the reaction is believed to proceed according to the equation shown below, although the inventors do not intend to be bound by this proposed explanation. The skilled artisan will recognize that $CrO_3$ is the anhydrous form of chromic acid and is used in the following equation for simplicity.

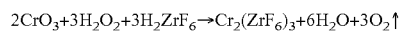

$$2CrO_3 + 3H_2O_2 + 3H_2ZrF_6 \rightarrow Cr_2(ZrF_6)_3 + 6H_2O + 3O_2 \uparrow$$

During the reaction and afterwards, the mixture remains essentially fully liquid and essentially free (i.e., only trace amounts, if any) of precipitates or suspended solids. The fluozirconic acid may be added simultaneously with the hydrogen peroxide, or may be admixed with the chromic acid prior to adding the hydrogen peroxide, or a combination of these.

If partially reduced chromic acid is used as the starting material, in some embodiments, it is prepared by reaction of chromic acid with an organic compound (for example, formaldehyde or methanol) which is oxidized by the chromic acid and results in partial reduction of the chromium.

In practice, more than a stoichiometric amount of hydrogen peroxide may in some cases be needed to achieve full reduction of chromium VI to chromium III. This may be the result of decomposition and/or volatilization of some amount of hydrogen peroxide during the reaction. Essentially no chromium VI remains after the hydrogen peroxide reaction is complete, as indicated by a negative test using the s-diphenylcarbazide method (ASTM D 1687-02, Chromium in Water, Test Method A), which produces a red-violet color in the presence of chromium VI.

Mixtures of high-purity chromium III salts can also be made by the above procedure, using mixed acids instead of a single acid such as fluozirconic. Formation of chromium III salts by the methods of this invention is believed to be general for a variety of salts, barring any specific detrimental interaction of the anion.

Using the methods of this invention, no mixing of separate trivalent chromium compounds (for example, $CrF_3$) with fluozirconic acid is required, and so no extraneous anions or cations are present in greater than trace amounts. The purity of the chromium III salt is determined mainly by the purity of the raw materials used to prepare it. The salt, presumably $Cr_2(ZrF_6)_3$, functions well in pretreatment compositions and improves the corrosion resistance of the substrate.

The methods of this invention make it possible to prepare chromium III salts with very low levels of contaminating cations and anions. In some embodiments, the amount of any given contaminating cation (typically a metal, especially an alkali metal) is less than 1000 ppm, or less than 500 ppm, or less than 300 ppm, or less than 200 ppm, relative to chromium. These limits may also apply specifically to the total of all alkali metal ions, or even to all metal ions in total.

Similarly, the content of contaminating anions may be very low, and in some embodiments the amount of any given contaminating ion is less than 1000 ppm, or less than 500 ppm, or less than 300 ppm, or less than 200 ppm, relative to chromium. In particular, these limits may apply individually to each of fluoride, chloride, bromide, iodide, nitrate and sulfate. These limits may also apply to the total of all of these anions, or even to all anions in total (including other anions not listed here).

An alternative method of making the chromium III fluozirconate is to first produce hydrous chromium oxide, sometimes referred to as hydrated chromium oxide or hydrated chrome oxide. This material, approximately of the formula $Cr_2O_3 \cdot nH_2O$ or perhaps $Cr(OH)_3$, can be made by reaction of $Cr_2(SO_4)_3$ (chrome alum) with a base such as NaOH. This approach requires washing out or otherwise removing the resulting $Na_2SO_4$ byproduct from the resulting hydrous chromium oxide so as to produce a product essentially free of contaminating cations and anions. Once such washing is complete, the hydrous chromium oxide is contacted with fluozirconic acid to form aqueous high-purity chromium III fluozirconate.

In all of the above methods, the molar ratio of zirconium to chromium in the final product will typically be about 1.5:1, as indicated by the stoichiometry implicit in the formula $Cr_2(ZrF_6)_3$. This calculates to a weight ratio of 2.63:1. The composition need not contain only $Cr_2(ZrF_6)_3$, however. Thus, the weight ratio can vary somewhat from the stoichiometric value. The ratio will typically be at least 2.4:1, more typically at least 2.5:1, and most typically at least 2.6:1. The weight ratio will typically be at most 3.0:1, more typically at most 2.9:1, and most typically at most 2.8:1. These ratios may be converted to their equivalent mole ratios, and the corresponding weight ratios may then be calculated for $Cr_2(TiF_6)_3$ and $Cr_2(HfF_6)_3$.

The purity of the chromium III fluozirconate provided by the invention may be very high, even of reagent grade. High-purity chromium III fluozirconate is suitable for use in any application for which the use of chromium III fluozirconate is known, for example in electroplating baths.

Metal Treatment Formulations Comprising High-Purity Chromium III Fluozirconate

Chromium III fluozirconate prepared according to the invention may be used to treat metal surfaces to improve corrosion resistance. In practical use, the absence of extraneous cations and anions provides a significant advantage. This is because chromium III fluozirconate solutions made by mixing $CrF_3$ with fluozirconic acid, for example, contain extraneous fluoride ions that continue to build up in concentration as the treatment bath is replenished with additional chromium III fluozirconate solution, as it is consumed by the metal being treated. Such buildup can cause the treatment coating to become weak and can also cause sludge to form in the bath. These problems may be practically eliminated by instead using the high purity chromium III fluozirconate solutions of this invention. Further, the high purity makes it possible to merely dry the solution in place on the treated metal surface without rinsing, if so desired, thereby saving a step and reducing waste handling.

Any metal may be treated, with particularly good results being obtained on zinc, zinc alloy, aluminum, and aluminum alloy surfaces. As used herein, the term "zinc alloy" means an alloy in which zinc is present at a weight percent greater than that of every other metal in the alloy. The term "alloy" is similarly defined for every other metal to which the term is applied. Metal alloys typically contain at least 50 wt % of the named metal.

The chromium III fluozirconate may be applied alone from aqueous solution to a metal surface and subsequently dried to remove water, resulting in effective passivation of the surface. Alternatively, the chromium III fluozirconate may be mixed with an organosilicon compound such as aminopropyl triethoxysilane to make a metal treatment formulation. The addition of organosilicon compounds may improve adhesion of subsequently applied coatings (such as paints) to the treated surfaces, while maintaining good corrosion resistance in a Neutral Salt Spray test.

The pH of metal treatment formulations according to the invention will typically be at least 2.5, more typically at least 3.0, and most typically at least 3.5. The pH will typically be at most 5.5, more typically at most 5.0, and most typically at most 4.5.

EXAMPLES

Preparation of High-Purity Chromium III Fluozirconate

Example 1

Aqueous chromic acid was placed into a beaker and fluozirconic acid was added. Hydrogen peroxide was then added with stirring until complete reduction of chromium was indicated by a very sharp color change from yellow-green to blue-green. A test for hexavalent chromium using s-diphenylcarbazide (a reagent specific to hexavalent chromium capable of detection of hexavalent chromium at levels at sub-micrograms per liter levels) was negative, confirming complete conversion to trivalent chromium.

Specific quantities are as below:
chromic acid (nominal 40%, aqueous)—36.2 g
fluozirconic acid (nominal 45%, aqueous)—100.0 g
hydrogen peroxide (nominal 35%, aqueous)—24.6 g+5.0 g extra Example 2

A mixture of chromic acid and fluozirconic acid was provided by dissolving chromium trioxide (reagent grade) in aqueous fluozirconic acid, and hydrogen peroxide was then added while mixing at a high rate to reduce the hexavalent chromium to chromium III. Completion of the reduction was signaled by the change in color from yellow-green to blue-green, and confirmation of the conversion was by s-diphenylcarbazide.

Specific Quantities:
chromium trioxide ($CrO_3$)—93.8 g
fluozirconic acid (45%, aqueous)—648.1 g
hydrogen peroxide (35%, aqueous)—258.1 g+23.5 g extra Example 3

BULK RINSE® 6A, a partially reduced chromic acid, was added to fluozirconic acid, and sufficient hydrogen peroxide was then added to complete the reduction of chromium VI to chromium III. The color once again indicated completion of the reduction, which was again confirmed by s-diphenylcarbazide addition.

Example 4

A large-scale preparation of $Cr_2(ZrF_6)_3$ was prepared in a manner analogous to Example 2 above, using the following amounts of ingredients.

chromic acid liquid (40%)—56.7 lbs
fluozirconic acid 156.3 lbs
hydrogen peroxide—62.2 lbs Reduction of chromium VI to chromium III was complete well before all of the hydrogen peroxide was added, but the rest of the hydrogen peroxide was still added. Apparently, this run did not require as great an excess of hydrogen peroxide as for the smaller scale preparations, although the reason for this is not completely clear.

Metal Treatment with High-Purity Chromium III Fluozirconate

The effectiveness of high-purity chromium III fluozirconate for passivating aluminum 2024 and 6061 panels was investigated according to U.S. Military specification MIL-DTL-81706B, dated 25 Oct. 2004. In particular, see reference to Type 2 non-chromate products. The treatment protocol was as shown below, and is similar to that disclosed in U.S. patent application Ser. No. 12/116,513 filed May 7, 2008, the entirety of which is incorporated herein by reference.

1) Clean—BULK KLEEN® 737G non-etching silicated alkaline cleaner (Bulk Chemicals, Inc.), 15 g/L, 140° F., 5 minutes
2) Rinse—Tap water, ambient temperature, 30 seconds
3) Deionized water rinse, ambient temperature
4) Chromium III treatment: panels immersed at 100° F., 5 minutes (See below for details of treatments)
5) Rinse with deionized water: ambient temperature, 30 seconds (for seal application the two steps below are included)
6) Seal; E-CLPS® 1900 chrome-free pretreatment (Bulks Chemicals, Inc.), 2% v/v dilution, ambient temperature, 30 seconds
7) Dry: 130° F. oven, 5 minutes A chromium III composition was prepared, including the following components:

| Constituent | Wt. % |
| --- | --- |
| 45% Fluozirconic Acid | 4.27 |
| Chromium (III) Fluoride Tetrahydrate | 1.05 |
| Ammonium Bifluoride | 0.0125 |
| Aminopropyl Triethoxysilane | 4.78 |
| Water | balance |

This composition, which had a Zr:Cr weight ratio of 2.80:1, was diluted with water to 4% of its original strength before being used to treat aluminum panels, as a control.

High-purity chromium III fluozirconate was prepared according to the method of Example 2, and supplied as a 37.9% stock solution. The solution was determined to have the following composition by weight, based on stoichiometric calculations using $Cr_2(ZrF_6)_3$ as the compound formula: 5.47% Cr, 14.42% Zr, 8.0% F and Zr:Cr=2.6:1 by weight. This stock solution was used in the following examples, diluted as indicated. In each case, treated panels were exposed to Neutral Salt Spray (NSS) for 336 hours according to ASTM B117, then rinsed and evaluated for pitting.

Example 5

A 0.121% dilution of the high-purity chromium III fluozirconate stock solution in deionized water was prepared, yielding the same level of Cr as in the control. This solution was adjusted to pH=4 using ammonium carbonate. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels. Thus, the high purity chromium III fluozirconate solution produced good results while avoiding the presence of extraneous fluoride ion, such as was present in the control formulation.

Example 6 a) A 2.21 g/L bath of the high-purity chromium III fluozirconate stock solution was prepared and 1.90 g/L of SIL-WET® A1100 aminopropyl triethoxysilane (available from Crompton Corporation of Greenwich, Conn.) was added to yield a similar amount of silane as in the control formulation. When heated to 100° F., this solution was hazy. Fluozirconic acid (1.5 g/L) was added to this bath to reach a pH of 4.0. While not as hazy, some floc was noted. The Zr to Cr ratio for this solution was 3.86:1. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

b) Another bath was prepared using 2.21 g/L of the high-purity chromium III fluozirconate stock solution and 0.22 g/l of $H_2ZrF_6$ heated to 100° F., and pH adjusted to 4.0 with ammonium carbonate. The bath was noted to be hazy. The Zr to Cr ratio for this bath was 3.0:1. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

c) Still another bath was prepared using a 2.21 g/L of the high-purity chromium III fluozirconate stock solution, and SILWET® A1100 1.0 g/L was added, resulting in a pH of 4.0 at 100° F. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

Example 7

A bath composed 0.22 g/L of the high-purity chromium III fluozirconate stock solution in water was adjusted with SIL- WET® A-1100 (1.0 g/L) to bring the pH up to 4.0. The resulting Zr:Cr ratio was 2.6:1 by weight. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

A final modification was made by adding 0.22 g/L of $H_2ZrF_6$ to the above bath to give a Zr to Cr ratio of 3.0:1. SILWET® A1100 (0.7 g/L) was further added to bring the pH of the bath to 4.0. Aluminum 6061 and 2024 panels were prepared using the treatment protocol shown above, with and without the E-CLPS® 1900 chrome-free pretreatment seal step. Following NSS, no pitting was observed for the panels treated with high-purity chromium fluozirconate or the control panels.

As the foregoing examples show, high-purity chromium III fluozirconate was effective as a standalone passivant for aluminum at a pH of 4.0 and at the concentrations tested, with or without subsequent sealing with E-CLPS® 1900 chrome-free pretreatment. The skilled person will appreciate that, depending on the type of metal being treated, optimization of pH, temperature, exposure time, Zr:Cr ratio, and/or chromium III concentration may be adjusted to provide the best performance.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An aqueous composition comprising dissolved $Cr_2(GF_6)_3$, in which G is a Group IV-B element, and containing less than 500 ppm of alkali metal ions and less than 200 ppm of halide ions, relative to chromium and which tests negative for chromium VI using s-diphenylcarbazide, wherein the composition contains one or more contaminating ions, and wherein each of said one or more contaminating ions is present at less than 1000 ppm relative to chromium, wherein said one or more contaminating ions are ions that are not part of the canonical formula of $Cr_2(FG_6)_3$.

2. The composition of claim 1, wherein G is zirconium.

3. The composition of claim 2, wherein the aqueous composition has a weight ratio of Zr:Cr in a range from 2.4:1 to 3.0:1.

4. The composition of claim 1, wherein G is titanium.

* * * * *